June 17, 1952     W. W. BURSACK     2,600,476
COERCING MEANS FOR GYROSCOPES
Filed Sept. 30, 1950
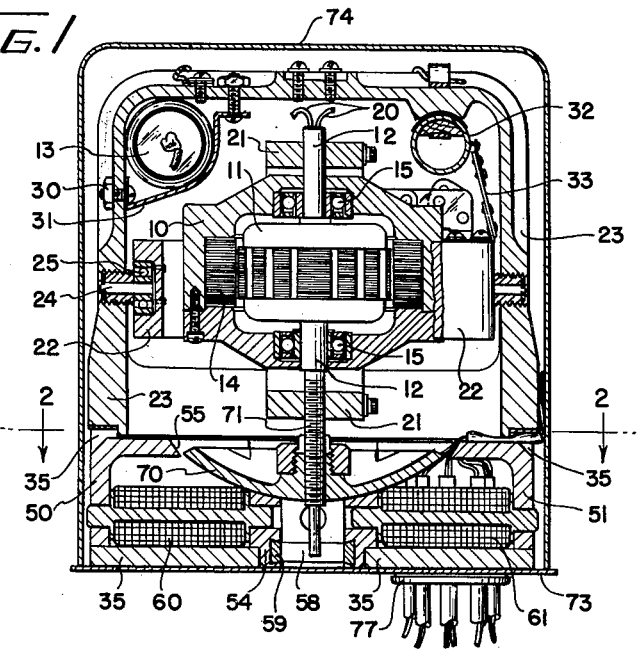
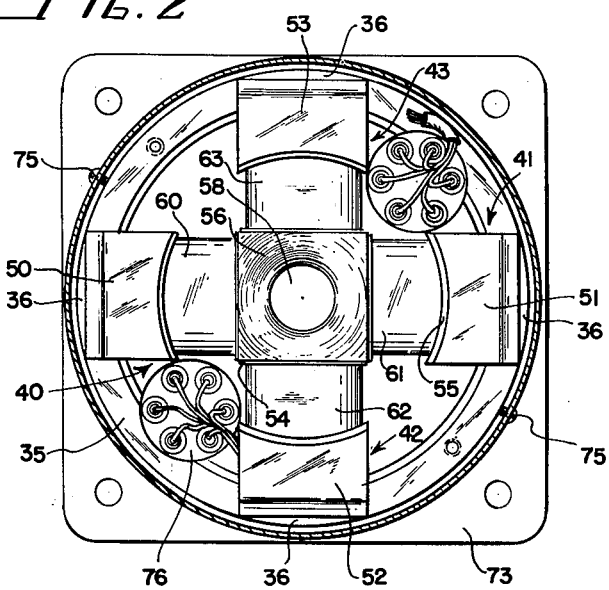
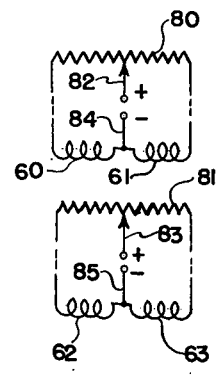
INVENTOR.
WILLIAM W. BURSACK
BY George H. Fisher
ATTORNEY Patented June 17, 1952

2,600,476

UNITED STATES PATENT OFFICE 2,600,476

COERCING MEANS FOR GYROSCOPES

William W. Bursack, Minneapolis, Minn., assignor to Minneapolis-Honeywell Regulator Company, Minneapolis, Minn., a corporation of Delaware Application September 30, 1950, Serial No. 187,712

9 Claims. (Cl. 74—5.4)

My invention relates to coercing means for gyroscopes and primarily to an improved electromagnetic apparatus for precessing a gyroscope within predetermined limits about two axes of freedom.

The improved electromagnetic apparatus of the subject invention employs a cruciform shaped magnetic core structure having two pairs of electromagnets energized from a unidirectional current supply which is variably controlled such that the polar strength of the magnets in each of the pairs varies inversely. The pairs of electromagnets are so aligned with the gyroscope parallel with the axes of freedom of the gyroscope to cause precession of the gyroscope about a complementary axis normal thereto. A single armature attached to the gyroscope cooperates with all of the electromagnets to coerce the gyroscope into the desired position.

It is therefore an object of this invention to provide an improved direct current type of gyroscope coercing apparatus which is simple in design, compact in structure and inexpensive to manufacture.

It is also an object of this invention to provide a gyroscope coercing means which is sensitive in operation and rapid and accurate in response.

These and other objects of this invention will become apparent from a reading of the attached description together with the drawings wherein:

Figure 1 is a side elevation view of the gyroscope in section.

Figure 2 is a plan view of the coercing means of the gyroscope omitting the armature as taken along the line 2—2 of Figure 1, and Figure 3 is a schematic showing of an energizing circuit for the subject coercing means.

The gyroscope which is controlled by the subject coercing means is shown in Figure 1 as largely conventional. It employs a rotor indicated 10 which is driven by a conventional split phase A. C. motor, the field structure 11 of which is stationarily mounted on the shaft 12 of the gyro rotor 10. Although the details of the motor are not shown, the field structure 11 employs a two phase winding therein which is adapted to be energized from a single phase source of power, one winding of which is energized through a condenser 13. The rotor mass 10 mounts the squirrel cage element 14 of the motor, the mass being journaled on the shaft 12 by means of bearings 15 in a conventional manner. As indicated in Figure 1, one portion of the shaft 12 is hollow and contains the lead wires 20 by means of which the field element 11 is energized. The rotor mass 10 is mounted in an inner gimbal 21 in such a manner that the rotor mass 10 is free to rotate as the shaft 12 and gimbal remain stationary. Inner gimbal 21 is in turn mounted in an outer gimbal 22 by means of cooperating shafts and bearings mounted in the gimbals respectively (not shown). This mounting gives an axis of rotation which is normal to the plane of the drawing and passes through the center of gravity of the gyroscope. The outer gimbal 22 is in turn mounted in a frame 23 of the gyroscope by means of cooperating pins 24 and bearings 25, the pins being mounted in the frame 23 and the bearings being mounted in the outer gimbal 22. This establishes a second axis of rotation for the gyroscope located in this plane of the drawing in Figure 1.

Frame 23 is generally U-shaped in form and mounts on its upper inner surface the condenser 13 for the spin motor of the gyro rotor as indicated in Figure 1 through suitable nuts and brackets indicated at 30 and 31 respectively. Frame 23 also mounts a potentiometer winding 32, a wiper 33 of which is attached to the outer gimbal 22 to indicate relative movement between the outer gimbal and the frame. A similar potentiometer winding and wiper assembly (not shown) are mounted respectively on the inner and outer gimbals to indicate relative displacement between these gimbals.

Frame 23 of the gyroscope is mounted on a frame 35 for gyro coercing means or precessing motors by means of a rabbeted fit and bolts not shown, this latter frame being best shown in Figure 2 as substantially cylindrical in form and having openings 36 therein in which two pairs of electromagnets indicated at 40, 41 and 42, 43 are mounted. Frame 35 is made of a non-magnetic material for purposes which will become evident as this disclosure proceeds. The magnetic portion of the pairs of electromagnets 40, 41 and 42, 43 forms a cruciform shaped core structure made up of four L-shaped core members 50, 51, 52, 53 and a central core member 54 which are attached together by suitable means not shown. As indicated in Figure 1, one extremity of each of the L-shaped core members fits into the central core member 54 which like the L-shaped core members is made of a magnetic material and serves as a common pole for the pairs of electromagnets. The opposite extremity of each of the L-shaped core members 50, 51, 52 and 53 is beveled and curved at its free extremity as indicated at 55. Similarly the centrally located core member 54 has a spherically curved concave upper surface 56, the curvature of the central core member and of the tips of the L-shaped core members 50, 51, 52 and 53 being substantially uniform. The central core member 54 also has an aperture 58 therein lined with a rubber bumper member 59 the purpose of which will be later noted. Further each of the L-shaped core members 50, 51, 52 and 53 have mounted along their extent between the central core member 54 and their beveled extremity 55 a winding 60, 61, 62 and 63 respectively. The L-shaped core members and the central core member as well as the winding 60—63 thereon are held in assembled relationship by suitable means (not shown) in the frame 35 of the coercing means.

Cooperating with the electromagnetic structure described above and attached to the gyroscope rotor shaft 12 is a disc-shaped or spherically curved armature 70 the radius of curvature being the same as that of surface 56. The armature 70 is attached to an extension 71 of shaft 12 which is threaded through the lower gimbal 21 of the gyroscope, the shaft extending beyond the armature 70 and into the aperture 58 in the central core member of the coercing means being adapted to contact bumper member 59 to limit displacement of the gyroscope with respect to its two axes of freedom defined above and displacement of the armature 70 with respect to the core structure. The armature 70 is made of a magnetic material such that when the windings 60—63 on the respective pairs of electromagnets 40, 41 and 42, 43 are energized, it will be attracted by all of the electromagnets.

The pairs of electromagnets 40, 41 and 42, 43 and the precession or coercing motor frame 35 is attached to a mounting flange 73 by suitable means. A cover 74 fits over the gyroscope and its mounting gimbals and frames as well as the coercing means and abuts the mounting flange 73 to enclose the gyroscope, the cover being secured to the frame 35 of the coercing means by screws or by any other suitable means such as soldering the cover to the flange 73 when a hermetically sealed gyroscope is desired.

Electrical connections of the field element 11 of the gyro rotor and the potentiometer windings 32, 33 are brought out of the gyro mounting flange 73 by a suitable connector indicated at 76. Similarly the windings 60, 61, 62 and 63 are so connected that the respective windings of each of the pairs of electromagnets are connected in series and the free extremities of the windings as well as the common extremities are brought out through the mounting flange 73 by means of a connector indicated at 77. Since the details of the spin motor and the potentiometer circuits are conventional and form no part of this invention they are not included here. The Figure 3 of the drawing, however, shows the connections of the pairs of windings of the electromagnets 60, 61, 62, and 63 of the electromagnets 40, 41 and 42, 43 to an energizing source of power. For simplicity these coils are shown as connected directly to remotely positioned potentiometer windings 80, 81 respectively having wipers 82, 83 which are operated independently of the gyroscope. The wipers 82, 83 of the potentiometer windings 80, 81 may, for example, be manually operated when the gyroscope is used as a stabilizing device in a control surface channel of an automatic pilot system for an aircraft such that the altitude of the aircraft may be manually controlled by movement of the wipers, or may be automatically operated by means of a motor or similar driving means which is operated by signals from a point remote from the aircraft or independent of the automatic pilot system. Each of the windings 80, 81 have center taps 84, 85 to which the pairs of windings are connected from a D. C. source of power. In this manner as the wipers of the remote potentiometers are varied in position along their respective windings 80, 81, the coils of the windings 60, 61 and 62, 63 of each pair are variably and proportionally energized in an inverse manner.

The operation of the gyroscope rotor and its associated gimbal means is conventional and will not be described in detail here. Energization of the spin motor of the gyro rotor, however, causes rotation of the rotor mass at a high speed and sets up rigidity in the gyroscope due to the spinning effect of the rotor mass. When so energized, the rotor remains rigid or stationary in space and upon tilt of the gyroscope through its associated mounting flange, relative movement between the frame 23 and outer gimbal 22 with respect to the gyroscope mast or inner gimbal takes place. The coercing means of the gyroscope acting through the armature 70 which is attached to the inner gimbal 21 is designed to urge the inner gimbal and hence the rotor mass to any desired or predetermined position depending upon the energization of the electromagnets 40, 41, 42 and 43. As indicated above, the pairs of electromagnets are energized independently from the D. C. source of power and through a potential divider arrangement in which the energization of the respective electromagnets varies inversely from a normal or neutral position. Armature 70 is placed in close magnetic association with each of the electromagnets of the pairs and hence is proportionately attracted by the respective electromagnets depending upon the energization thereof. The coils of the electromagnets are so connected that the ends thereof common to the central core member have the same magnetic polarity and hence the electromagnets in each pair exert opposing force in diametrically opposite directions on the armature. Similarly the pairs of electromagnets exert forces on the gyroscope through the magnetic attraction of the armature 70 in directions which are normal to one another and hence the resultant of these forces is applied to the gyroscope to precess it to a predetermined or desired position about both of the axes formed by the gimbals of the gyroscope. Depending upon the manner in which the subject gyroscopes is to be used, the energizing controlling means or potentiometers may be varied or operated. This opposed magnet system is such that the gyroscopes will rapidly and accurately respond to a need for changing the position of the gyroscope and magnets and cooperating armature are so designed to give a simple yet compact structure.

While the present invention has been disclosed in connection with an electrically motor driven gyroscope, it is to be understood that it can be applied to any type of gyroscope in which it is desired to position the gyroscope with respect to a pair of axes of freedom. Similarly, while the parts of precession or coercing means have been specifically described, it is to be understood that the invention should be limited only by the appended claims.

I claim as my invention:

1. Means for coercing a gyroscope which is mounted on a frame for pivotal movement about a pair of axes disposed normal to one another comprising, a magnetic core structure attached to said frame and including a central pole member and two pairs of pole members each member of which abuts at one extremity said central pole member to form a cruciform shaped structure, the pole members of each pair being so aligned with one another and said central pole member to be normal to one of said axes about which said gyroscope is adapted to be pivoted, an energizing winding mounted on each of said pole members forming said pairs, means adapted to variably control the energization of said windings from a D. C. source of power such that like magnetic polarities exist at the extremities of said pole members abutting said central pole member and such that the strength of the magnetic poles varies inversely between the pole members forming said pairs, and a spherically shaped member of magnetic material secured to said gyroscope and magnetically associated with said core structure.

2. Means for coercing a gyroscope mounted for pivotal movement about a pair of axes disposed normal to one another comprising, a magnetic core structure including a central pole member and two pairs of pole members each member of which abuts at one extremity said central pole member to form a cruciform shaped structure, the pole members of each pair being so aligned with one another and said central pole member to be normal to one of said axes about which said gyroscope is adapted to be pivoted, an energizing winding mounted on each of said pole members forming said pairs, means adapted to variably control the energization of said windings from a D. C. source of power such that like magnetic polarities exist at the extremity of said pole members abutting said central pole member and such that the strength of the magnetic poles varies inversely between the pole members forming said pairs, and a spherically shaped structure of magnetic material magnetically associated with said core structure, one of said structures being mounted on said gyroscope and the other on a relatively fixed part.

3. Means for coercing a gyroscope which is pivotally mounted for movement about a pair of axes disposed normal to one another comprising, a magnetic core structure including a central core member and two pairs of L-shaped core members, said L-shaped core members being disposed to abut at one extremity said central core member and being so aligned with said central core member in pairs to be normal to one of said axes about which said gyroscope is adapted to be pivoted, an energizing winding mounted on each of said L-shaped core members, means adapted to variably control the energization of said windings such that like magnetic polarities exist at the extremities of said core members abutting said central core member and such that the strength of the magnetic poles formed thereby varies inversely between the core members forming said pairs, and a second structure of magnetic material disposed in magnetic association with said first named magnetic core structure, one of said structures being mounted on said gyroscope and the other on a relatively fixed part.

4. Means for coercing a gyroscope mounted for pivotal movement about a pair of axes disposed normal to one another comprising, a magnetic core structure including a central core member and two pairs of L-shaped core members, each of said L-shaped core members having energizing windings thereon and being magnetically connected with said central core member forming therewith a two pole electromagnet, said L-shaped core members of each pair being aligned with one another and normal to one of said axes about which said gyroscope is adapted to be pivoted, means adapted to variably control the energization of said windings on said L-shaped core members such that the strength of the poles of said electromagnets formed thereby vary inversely between the electromagnets formed by said pairs of said L-shaped core members, and a spherically shaped structure of magnetic material disposed adjacent said electromagnets and magnetically associated therewith, one of said structures being mounted on said gyroscope and the other on a relatively fixed part.

5. Means for coercing a gyroscope mounted for pivotal movement about a pair of axes disposed normal to one another comprising, a magnetic core structure including a central core member and two pairs of L-shaped core members, each of said L-shaped core members having energizing windings thereon and being magnetically connected with said central core member forming therewith a two pole electromagnet, said L-shaped core members of each pair being aligned with one another and normal to one of said axes about which said gyroscope is adapted to be pivoted, said L-shaped core members and said central core member having curved surfaces thereon of substantially uniform radius of curvature, a disc-shaped magnetic core structure having substantially the same radius of curvature as said L-shaped core members and said central core member being disposed adjacent said first named magnetic core structure and magnetically associated therewith, one of said structures being attached to said gyroscope and the other to a relatively fixed part, means adapted to variably control the energization of said windings such that the electromagnets formed thereby will have pole strength which varies inversely between the electromagnets formed by said pairs of said L-shaped core members.

6. Means for coercing a gyroscope mounted for pivotal movement about a pair of axes disposed normal to one another comprising, a magnetic core structure including a central core member and two pairs of L-shaped core members, each of said L-shaped core members having energizing windings thereon and being magnetically connected with said central core member forming therewith a two pole electromagnet, said L-shaped core members of each pair being aligned with one another and normal to one of said axes about which said gyroscope is adapted to be pivoted, said L-shaped core members and said central core member having curved surfaces thereon of substantially uniform radius of curvature, and a disc-shaped magnetic member having substantially the same radius of curvature as said L-shaped core members and said central core member attached to said gyroscope for movement therewith about said axes being disposed adjacent said magnetic core structure and magnetically associated therewith, and means adapted to variably control the energization of said windings on said L-shaped core members from a D. C. source of power such that like magnetic polarities exist at the poles of said electromagnets common to said central core structure and such that the strength of the magnetic poles of said electromagnet varies inversely between the electromagnets formed by said pairs of L-shaped core members.

7. In a device of the class described, a cruciform shaped core structure having a common central pole and four outer poles each of which forms with said central pole a two pole electromagnet, said poles having curved surfaces thereon, a spherically shaped armature of magnetic material disposed adjacent the curved surfaces of said poles, means mounting said armature for pivotal movement relative to said poles of said electromagnets under the attractive influence of said electromagnets, means for energizing pairs of said electromagnets formed by diametrically opposed outer poles and said central pole such that said armature is attracted equally and in opposite directions by forces from said pairs of electromagnets, and means for varying the energization of said electromagnets making up each of said pairs inversely.

8. Means for coercing a gyroscope mounted for pivotal movement about a pair of axes disposed normal to one another comprising, a cruciform shaped core structure having a common central pole and four outer poles each of which forms with said central pole a two pole electromagnet, means mounting said core structure on a relatively fixed part such that pairs of said electromagnets formed by diametrically opposed poles are disposed normal to one of said axes about which said gyroscope is adapted to be pivoted, an armature of magnetic material mounted on said gyroscope and disposed adjacent the poles of said electromagnet with a substantially uniform air gap between said armature and each of said outer poles when said gyroscope is in a normal position, means for energizing the electromagnets formed by diametrically opposed poles such that said armature is attracted by opposed forces from said electromagnets, and means for varying the energization of said electromagnets inversely.

9. Means for coercing a gyroscope mounted for pivotal movement about a pair of axes disposed normal to one another comprising, a cruciform shaped core structure having a common central pole and four outer poles each of which forms with said central pole a two pole electromagnet, means mounting said core structure on a relatively fixed part such that pairs of said electromagnets formed by diametrically opposed poles are disposed normal to one of said axes about which said gyroscope is adapted to be pivoted, an armature of magnetic material mounted on said gyroscope and disposed adjacent the poles of said electromagnet with a substantially uniform air gap between said armature and each of said outer poles when said gyroscope is in a normal position, means for energizing the electromagnets formed by diametrically opposed poles such that said armature is attracted by opposed forces from said electromagnets, means for varying the energization of said electromagnets inversely, and means included in said armature and said core structure for limiting relative movement therebetween.

WILLIAM W. BURSACK.

REFERENCES CITED

The following references are of record in the file of this patent:

UNITED STATES PATENTS

| Number | Name | Date |
|---|---|---|
| 1,390,471 | Sundhaussen | Sept. 13, 1921 |
| 1,613,301 | Umetsu | Jan. 4, 1927 |
| 2,414,102 | Hull et al. | Jan. 14, 1947 |
| 2,516,912 | Reichel et al. | Aug. 1, 1950 |